United States Patent [19]

Hamrick, Jr.

[11] Patent Number: 5,504,808
[45] Date of Patent: Apr. 2, 1996

[54] SECURED DISPOSABLE DEBIT CARD CALLING SYSTEM AND METHOD

[76] Inventor: James N. Hamrick, Jr., 158 Mountain St., Rutherford, N.C. 28139

[21] Appl. No.: 252,271

[22] Filed: Jun. 1, 1994

[51] Int. Cl.$^6$ .......................... H04M 11/00; H04M 9/00; H04M 1/00
[52] U.S. Cl. .................. 379/144; 379/114; 379/140; 379/91; 235/380; 340/825.34; 283/94; 283/95
[58] Field of Search ....................... 379/112, 114, 379/121, 130, 131, 143, 144, 155, 91–93; 235/380, 281, 382; 283/94, 95; 340/825.34, 825.27

[56] References Cited

U.S. PATENT DOCUMENTS

| | | | |
|---|---|---|---|
| 4,706,275 | 11/1987 | Kamil | 379/144 |
| 4,863,196 | 9/1989 | Ohnishi et al. | 283/94 X |
| 4,901,241 | 2/1990 | Schneck | 235/380 X |
| 5,286,061 | 12/1994 | Behm | 283/95 |

OTHER PUBLICATIONS

Debit Cash exhibits supplied by ex'r.

*Primary Examiner*—Stephen Chin
*Assistant Examiner*—Paul Loomis
*Attorney, Agent, or Firm*—Dority & Manning

[57] ABSTRACT

A card and associated system and method provides disposable but secure telephone debit cards. Identifying indicia are disposed on the telephone debit card surface, and temporarily covered so that it cannot be visually or photographically detected. After purchase of a debit card from a distribution terminal or device, a user is able to remove the temporary covering and access a telephone service system by first accessing a central system server and communicating to such central system server the now revealed identifying indicia on the purchase card. The central system server monitors the duration of a user's telephone usage, and charges an appropriate associated toll against the debit card's predetermined debit limit. Separate toll rates may be applied for different forms of calls, eg., interstate long distance, intrastate long distance, local, or even collect or conference calling, or modem service. Use of a central system server can open the system to providing additional options or user services, such as gaming procedures involving gaming indicia optionally disposed on the debit card surface and, if desired, access to a central gaming system. Additionally, provisions may be made for a user to access an electronic voice mail system through the central system server.

21 Claims, 3 Drawing Sheets

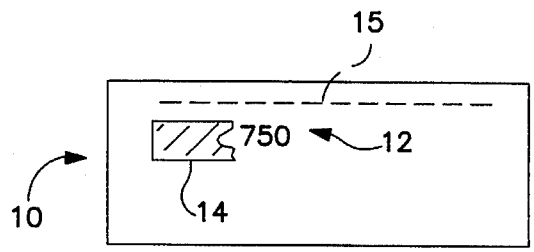
FIG. IA
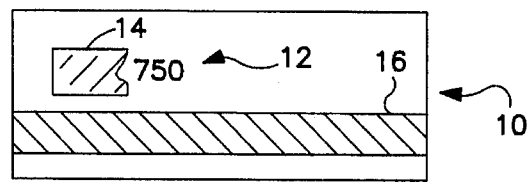
FIG. IB
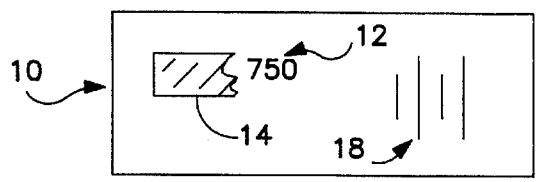
FIG. IC
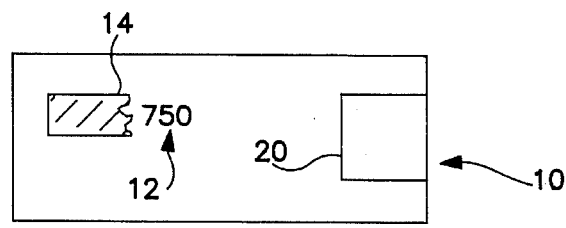
FIG. ID
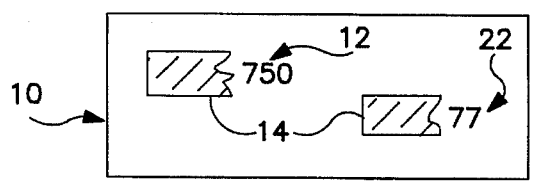
FIG. IE

SECURED DISPOSABLE DEBIT CARD CALLING SYSTEM AND METHOD

BACKGROUND OF THE INVENTION

This invention relates generally to an improved debit card and related calling system for providing controlled telephone service system access with secure, low cost and low maintenance debit cards, and more particularly to a debit card system for securely distributing disposable debit cards, with identification indicia preprinted thereon, for use in conjunction with an access system allowing use of a telephone service system. The invention furthermore particularly concerns providing improved disposable debit cards that are fully securable from the point of manufacture to the point of sale to user. The invention also relates to corresponding methodologies throughout.

Coin operated public pay telephones have long permitted access to either one or both of local and long distance telephone service systems. Typically, until relatively recently, such service systems and pay phones were part of either an integrated system or a system comprised of related companies. Such telephones have, however, presented difficulties that have recently led to significant developments in the industry, among other major changes occasioned by modern day long distance network competition and by competition in other services areas.

From a telephone company's perspective, pay telephones require a sturdy, secure mechanical device capable of preventing theft and withstanding associated vandalism. They also require manpower expense and an inherent safety risk in that company employees must regularly visit and remove cash from each such pay telephone. From a user's standpoint, coin operated pay telephones are entirely useless if the user is without the required coins, or unless some operator intervention or emergency (911) or other type of toll free number is involved. Furthermore, long distance calls often require more change than most people ordinarily can conveniently carry. At the same time, pay telephones adequately sophisticated to handle paper currency, are much more expensive to own and operate than coin operated models, and pose still greater theft and safety issues.

Consequently, there came a time whenever competing telephone companies began to employ credit card type calling systems. Such systems were intended to relieve the telephone companies from maintaining and servicing pay telephones. They also were intended to conveniently allow the user to make calls from any telephone and bill the charge to an established account simply by keying in the account number. Such a number typically may include the user's telephone number plus a personal identification number (PIN), entered at an appropriate prompt.

At least one major drawback and limitation of such "calling cards," however, is that they require that a user have an account with the telephone company. International travellers, college students, and others who might not have a residence or business telephone account with a telephone company normally would not even have access to such forms of calling cards. They would be forced, therefore, to use conventional pay telephones with the aforementioned drawbacks.

Additionally, such calling cards lack the convenience of cash, with respect to both the telephone company and the user. The company must establish, bill, and maintain a great number of accounts. The user incurs a monthly debt, after also having the time lag of establishing an account.

Furthermore, because many calling cards are issued on a long term basis (eg., multiples of years), the identifying PIN number cannot be printed on the card without taking a substantial risk of loss upon a card's theft or accidental loss. The burden of securing a card's PIN number (usually through memorization) is thus very inconveniently put upon the user.

More recently, the telecommunications industry has sought to address various of the above problems through use of debit card systems. Such systems typically employ debit cards, purchased by a user through one of various distribution methods, and having a preset debit limit recorded (or, in other words, a positive available amount credited) at a central system server (such as comprising a specialized computerized telephone switching and control system). After purchase, the user accesses the telephone system through such central system server. During such process, the server prompts the user for debit card identification and charges the calling fees against the preset debit limit. Once the debit limit is met, the card is no longer of any value and may be discarded.

There are at least several advantages with such an approach. For example, no account need be maintained, and the user need not necessarily remember any PIN number. While a user needs cash or its equivalent to initially purchase the debit cards, one would be able to use paper currency, such as typical of many conventional vending machines. Such machines, in turn, may be generally better secured than conventional pay phones, and thus, greatly reduce the risk of vandalism to public telephones.

Debit card systems may generally be placed in one of two categories. First, card based systems program or incorporate operation intelligence directly into or onto the card itself, typically employing a magnetic strip, optical scan area, or electronic chip disposed on the surface of the card. Such media contain the card's identification information and, importantly, its debit limit. Upon access to a central system server, the user may insert the debit card into a requisite specialized phone receptacle and place his call. The server then contemporaneously charges the call against the card's debit limit as recorded on the card itself. After the user completes a call, if the card's preset or modified limit has not been reached, the user may retrieve the card for use with subsequent calls.

As will be readily apparent from the foregoing, card based systems have the tremendous expense and disadvantage of requiring special telephones capable of reading and recording information on the card. Such card based systems also have the major inherent disadvantage of being system specific. In other words, one phone system set up to handle magnetic media based cards would not be able to handle, for example, optical media based cards, and vice versa.

In contrast, network based debit systems typically are intended to be used with any conventional telephone. Such systems rely on centrally recorded card identification and debit limit information. Identification information is literally indicated on the card itself. When a user accesses the central system server, he responds to a prompt seeking such information by, for example, keying or speaking. When the system validates the card's identification, it allows the user to make a call, charging the card's debit limit as with card based systems, but keeping the updated information within the central system rather than on the card.

One major difficulty with present network based systems is security of card identification information. While both card based and network based systems are subject to card theft, network based systems are furthermore particularly vulnerable in that card identification indicia is typically visible, allowing theft by sight without physically taking the cards. Still other systems may be vulnerable to internal or source fraud, if "hot" (i.e., activated) cards or account information about same, are stolen without any system safeguards for handling such contingencies.

Such problems create a strong incentive to use more costly card based systems to overcome the problems with conventional pay telephones and calling card systems, as well as a disincentive to expand the use of debit cards associated with telephone systems beyond telephone billing systems.

SUMMARY OF THE INVENTION

The present invention recognizes and addresses various of the foregoing problems and others associated with providing telecommunications services in general, and in particular, as associated with operating and maintaining a user card calling system. Accordingly, it is one general object of the present invention to provide an improved user card calling system, and corresponding methodologies and cards. It is a more particular object to provide such an improved system providing disposable debit cards that are fully securable, relative to system use, from the point of manufacture to the point of sale (and even beyond).

It is still another object of the present invention to provide a secured debit card calling system capable of utilizing relatively low technology, low maintenance distribution devices for preprinted cards, and existing telephones. A more particular object is to eliminate the need to have any sort of specialized field equipment for generating debit cards, or any sort of specialized phone equipment for using such debit cards.

Yet another object is to provide a system capable of voiding account credits for debit cards known to be stolen or otherwise compromised.

It is another general object to provide an improved card and card based debit card calling system providing additional optional access to a gaming system. More specifically, it is yet another object to provide a debit card having gaming indicia and/or gaming account data included therewith for enabling the user to access a central gaming system with such gaming identification indicia.

Another present object is to provide a debit card and corresponding system capable of providing a random incentive reward (eg., additional calling time), which is automatically associated with an account for a corresponding card, but which is unknown to the purchaser until after the purchase.

A still further object is to provide an improved calling system as outlined herein, and also capable of providing variously user selected services, such as voice mail, and access to either local or long distance telephone service, with automatic system rate differentiation.

Another general object is to provide a user friendly system with the secured disposable debit card arrangement as referenced herein.

Additional objects and advantages of the invention are set forth in, or will be apparent to those of ordinary skill in the art from, the detailed description which follows. Also, it should be further appreciated that modifications and variations to the specifically illustrated and discussed features or steps hereof may be practiced in various embodiments and uses of this invention without departing from the spirit and scope thereof, by virtue of present reference thereto. Such variations may include, by are not limited to, substitution of equivalent means, features, or steps for those shown or discussed, and the functional or positional reversal of various parts, features, or steps, and the like.

Based upon the foregoing general objects and aspects of this invention, together with the remaining disclosure herewith, those of ordinary skill in the art will appreciate that a variety of embodiments may comprise different combinations of presently disclosed features, steps, or their equivalents (including combinations of features or steps or arrangements thereof not expressly shown in the Figures or stated in the detailed description).

One exemplary embodiment in accordance with the present invention, comprises a disposable telephone debit card temporarily concealing user-needed identifying indicia thereon. Such an exemplary card preferably includes a supporting substrate having at least a first surface and further including identifying indicia disposed on a predetermined area of such first surface. Such indicia comprises a unique account code known to a central system server for subsequently enabling user access to a telephone service system for a time period bounded by a charge rate of such telephone service system and by a predetermined credit amount associated with the unique account code corresponding with such identifying indicia.

Another exemplary embodiment of this invention is directed to a debit card calling system, comprising a plurality of disposable telephone debit cards, at least one distribution outlet, and an access system. Such card preferably are provided with respective unique account identifying indicia associated therewith initially concealed from a user. Each card also includes a respective supporting substrate and unique account identifying indicia disposed on a surface thereof. The at least one distribution outlet is provided for distributing such disposable telephone debit cards to respective users.

The foregoing access system is preferably operative with a plurality of telephone terminals, and included a central system server, accessible by a user of such a telephone debit card via such telephone terminals. The central system server is preferably operative for storing predetermined account information of established credit respectively corresponding to each of the disposable telephone debit cards, for prompting a card user for forwarding identifying indicia, for enabling card user access to a telephone service system upon receipt of a signal corresponding to valid identifying indicia for a time period bounded by a charge rate of such telephone service system and by the established credit amount associated with the unique account corresponding with such valid identifying indicia. The central system server is further operative for adjusting, after the completion of access to such telephone service system by the card user, the established credit limit corresponding with the identifying indicia associated with a respective card.

Various embodiments of the subject invention are concerned with corresponding methodologies. For example, one present exemplary system methodology is directed to the debit card calling method further comprising the steps of a debit card calling system methodology, including:

placing in a plurality of user operated vending stations a quantity of preprinted disposable debit cards, each of which cards has a unique account code printed thereon and at least partially initially concealed from an intended user by a user removable mask layer;

establishing a central system server, accessible by use of such a unique account code via a toll free telephone line, and in control of further access to at least one telephone service system;

providing the central system server with data as to a predetermined credit amount associated with each unique account code for each preprinted disposable debit card placed in one of the vending stations; and operating the central system server so as to permit controlled user access to the telephone service system via a unique account code associated with the user's card, including permitting such access only as to unique account codes having a remaining credit amount associated therewith, automatically monitoring, debiting, and updating data as to remaining credit amounts for respective unique account codes as telephone service is accessed therethrough for certain time periods at a predetermined charge rate, and automatically interrupting user access whenever the remaining credit amount associated with the unique account code for such user's card is fully utilized.

Yet another exemplary embodiment of the present invention relates to a debit card calling method, comprising the steps of printing a plurality of disposable telephone debit cards with respective unique accounts identifying indicia associated therewith initially concealed from a user; initiating an established credit limit, recorded and updated by a central system server, corresponding to the unique account identifying indicia of each of such disposable telephone debit cards; distributing such disposable telephone debit cards to respective users; prompting, by the central system server, a user of a disposable telephone debit card who accesses the server from a telephone terminal, for identifying indicia; receiving, by the central system server, from such user via the telephone terminal a signal corresponding to such identifying indicia; enabling, upon receipt by the central system server of a signal corresponding to valid identifying indicia, access by such user to a telephone service system via the central system server, such that the user's access is limited to a period bounded by a charge rate of such telephone service system and the established credit amount associated with the unique account corresponding with the valid identifying indicia; and adjusting, after completion of access to such telephone service system by the card user, the established credit limit corresponding with the identifying indicia associated with a respective card.

The foregoing objects, features, and aspects of the present invention, including exemplary cards, system apparatus and methodology, are discussed in greater detail below.

BRIEF DESCRIPTION OF THE DRAWINGS

A full and enabling disclosure of the present invention, including the best mode thereof, directed to those of ordinary skill in the art, is set forth in the remaining specification, with reference to the accompanying figures, in which:

FIG. 1A is a plan view of one exemplary embodiment in accordance with this invention of a telephone calling system debit card having at least part of unique account code identification indicia associated therewith temporarily covered by an opaque or equivalent mask;

FIG. 1B is a plan view of a present exemplary telephone debit card, such as in FIG. 1A, having an optional magnetic strip disposed on its surface for the recordation of additional identification and/or gaming indicia information;

FIG. 1C is a plan view of a present exemplary telephone debit card, such as in FIG. 1A, having an optional optical scan area disposed on its surface for the recordation of additional identification and/or gaming indicia information;

FIG. 1D is a plan view of a present exemplary telephone debit card, such as in FIG. 1A, having an optional electronic memory device disposed on its surface for the recordation of additional identification and/or gaming indicia information;

FIG. 1E is a plan view of a present exemplary telephone debit card, such as in FIG. 1A, having optional gaming indicia thereon temporarily covered by an opaque or equivalent mask disposed on its surface.

Figure 2:
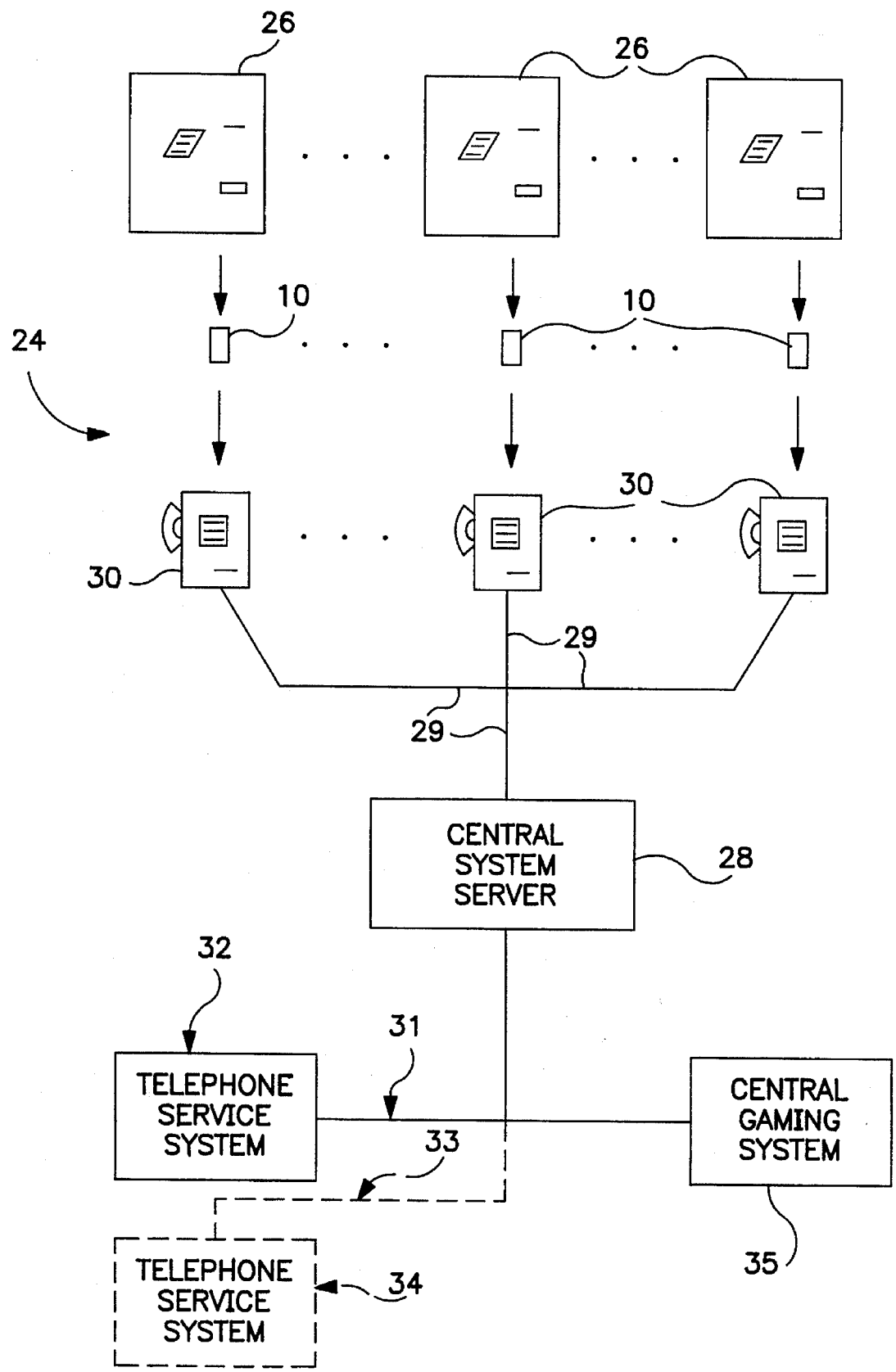
FIG. 2 diagrammatically illustrates another exemplary embodiment of the present invention, generally representing a debit card calling system, such as comprising a plurality of vending machines for dispensing debit cards, while allowing user access through a plurality of conventional telephones to a telephone service system and/or central gaming system, via a central system server.

Repeat use of reference characters in the following specification and accompanying drawings is intended to represent the same or analogous features, elements, or steps of the present invention.

DETAILED DESCRIPTION OF THE PREFERRED EMBODIMENTS

Reference will now be made in detail to the presently preferred embodiments of the invention as illustrated in the accompanying drawings. The drawings are provided by way of explanation of the invention, and are not intended as limiting thereof. In fact, it will be apparent to those skilled in the art upon viewing the specification and drawings herein that various modifications and variations can be made without departing from the scope or spirit of the invention. For instance, various methods or devices may be employed to secure debit card identification and gaming information on a debit card.

FIGS. 1A, 1B, 1C, 1D, and 1E respectively illustrate five exemplary embodiments of the present invention. FIG. 1A depicts a telephone debit card 10 having debit card identifying indicia 12 disposed thereon and covered, such as by an opaque mask 14 or the like. Additional indicia (generally represented by reference character 15) may also be provided elsewhere on a surface of card 10 as part of unique account identifying indicia, without any removable covering specifically thereover.

FIG. 1B depicts a telephone debit card as in FIG. 1A additionally having a magnetic strip 16 disposed on the surface thereof. Such magnetic strip features are well known to those of ordinary skill in the art, and details thereof form no particular part of the subject invention. Additional account identification information and/or gaming information may be recorded on magnetic strip 16, allowing optional use of debit card 10 in telephones designed to read and/or record information from and/or on such media, as is known in the art.

Similarly, FIGS. 1C and 1D illustrate telephone debit cards as in FIG. 1A having optional optical scan area 18 and electronic memory device 20, respectively, for storing additional identification and/or gaming data. Details of exemplary such areas 18 (such as bar code arrangements) and devices 20 (such as electronic chips) are well known in the art without further discussion, and form no particular part of the subject invention beyond the combinations represented. FIG. 1E illustrates a telephone debit card as in FIG. 1A having gaming indicia 22 printed on the surface thereof and temporarily covered by opaque mask 14.

The use of opaque masks to temporarily cover gaming indicia on lottery tickets is well known in the art. It is to be understood to be within the scope and spirit of the present invention to employ any and all such materials and methods in applying opaque mask 14 or similar to telephone debit card 10 (such as made of paper stock or other suitable materials). In particular, various security schemes have been developed in conjunction with printing of such lottery tickets to prevent unauthorized duplication, forgery, or other security problems. Such are exemplary of systems which may be currently practiced with this invention, and it is intended that all such devices and methods come within the scope of the present invention. U.S. Pat. No. 4,725,079 to Koza et al., pertains to one exemplary system, and the entire disclosure of such patent is hereby fully incorporated by reference.

FIG. 2 illustrates a present exemplary debit card calling system generally 24 employing a plurality of debit cards 10 purchased, for example, from vending machines 26. Purchasers/users may then access central system server 28 by telephones 30 via conventional phone lines 29 (either long distance or local). Server 28 may comprise virtually any suitable system, such as a computerized telephone switching network specialized for handling and distributing incoming traffic while interfacing with account validation and tracking, as described herein. If there is long distance service involved in the initial contact via lines 29, then toll free access may be provided to server 30. With such an arrangement, even international dialing potential is provided. For example, U.S. toll free numbers may presently be accessed from Mexico. In this presently preferred exemplary embodiment, telephones 30 may also advantageously comprise virtually any conventional telephone, without requiring any special equipment for use of debit cards 10.

A user, upon obtaining a debit card 10, as in any of Figures 1A through 1E, may remove opaque mask 14 covering identification indicia 12 thereon. Initial enclosure within a vending machine may be regarded as part of the concealment of indicia within the scope of this invention. Once having all of such information 12 (either by itself or in combination with indicia 15), a user can respond to a prompt from central system server 28 by, for example, keying the requisite identification indicia (12 and/or 15) into a telephone 30. With an appropriately established server 28, indicia may be vocally input by the user. However communicated, upon receipt of a valid debit card identification, central system server 28 enables the user to access telephone service system 32, such as via a long distance or local connection 31.

Central system server 28 thereafter monitors the duration of the user's call and automatically charges an appropriate toll for such call (at the corresponding rate) against a predetermined limit credited for the debit card 10 unique account identified by the user. If the user ends the call before reaching such predetermined credit limit, central system server 28 resets such limit for the identified debit card 10, which enables the user to subsequently use such card. On the other hand, if the card's limit is reached during its use, central system server 28 interrupts the call, for example, giving the user an opportunity to employ an additional debit card 10 or otherwise terminating transmission or service access.

Another entire facet of the invention is that server 28 may also be established and operative for providing a user various service choices, such as represented in dotted line in FIG. 2 by alternative service connection line 33 and by alternative telephone service system 34. Such may be competing long distance carriers directly selected by the user, or a choice between long distance service and local service indirectly selected by the user simply based on a phone number (or perhaps an area code) dialed. Such alternatives may also include other options, such as voice mail service, or non-phone service alternatives such as accessing remaining credit information for a given account.

Furthermore, if a user purchases a debit card 10 containing gaming indicia as in FIGS. 1B through 1E, central system server 28 may be operative for enabling user access to central gaming system 35, for example a state lottery system.

Figure 3:
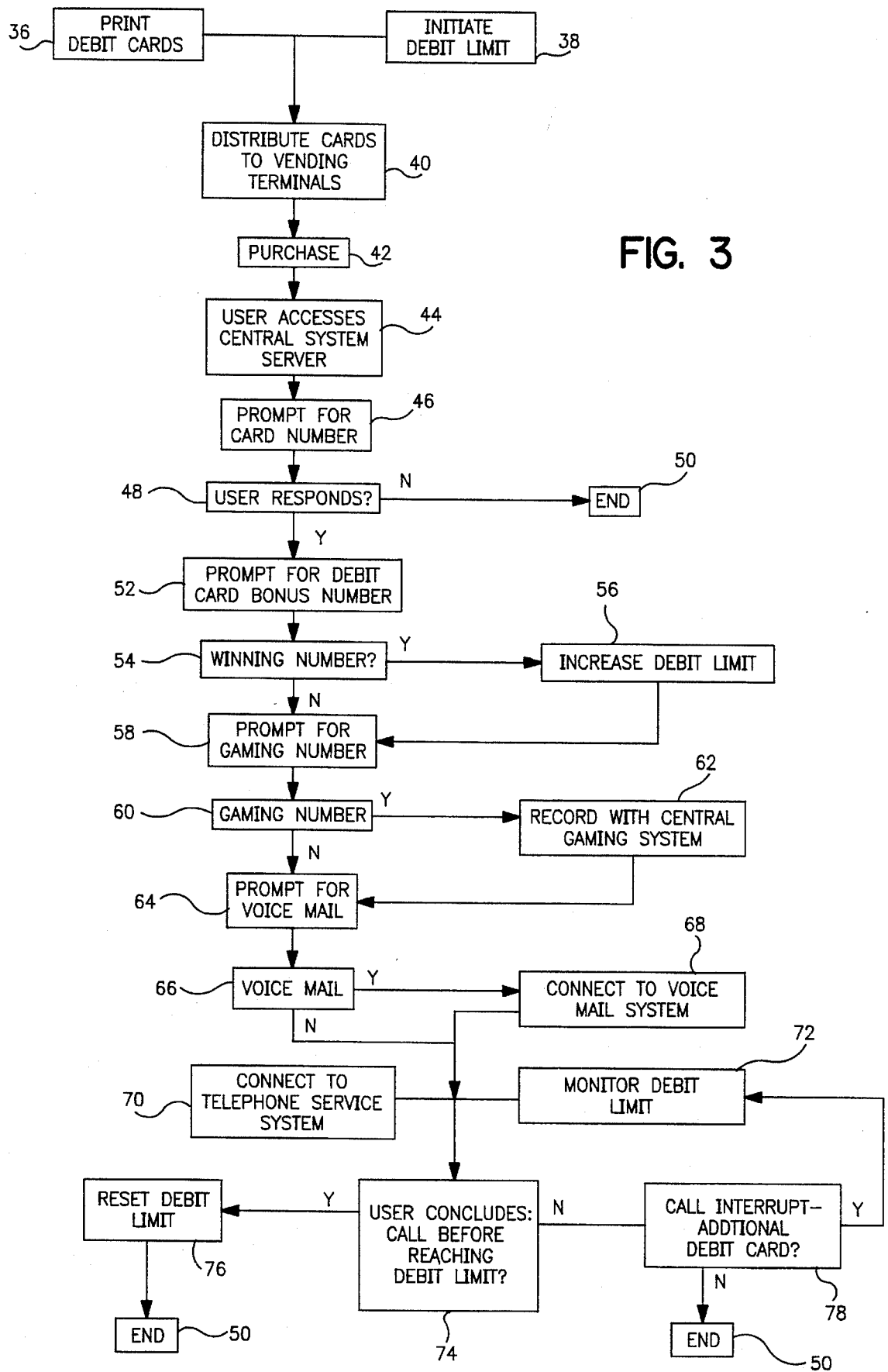
FIG. 3 is a flow chart representing an exemplary embodiment of the present invention, particularly representing operation or methodology of the present invention with respect to the purchase and subsequent use of one debit card by one user.

FIG. 3 illustrates a flow chart configuration for certain exemplary present procedures or methodology, particularly depicting the operation of one exemplary embodiment of the present invention with respect to one purchaser/user of a debit calling card.

Initially, at steps 36 and 38 respectively, debit cards 10 such as in FIGS. 1A through 1E are printed (or otherwise provided) and their associated debit limits are recorded (i.e., initiated) at central system server 28. Debit cards 10 are distributed to vending machines 26 at step 40 where one or more of such cards may be purchased by a purchaser/user at step 42. It is to be understood that practice of non-machine vending arrangements (such as convenience store sales or the like) are included aspects of the subject invention. After revealing the identifying indicia 12 on a debit card 10, a user may access central system server 28 through a telephone 30 during step 44.

At step 46, central system server 28 prompts the user for debit card identification. If the user fails to provide a valid debit card identification at step 48 (for example, by speech or keying), central server 28 ends the communication at step 50. If the user responds with a valid debit card identification, corresponding to the identifying indicia 12 on a debit card 10, central server 28 may prompt (step 52) the user for a debit card bonus number, as, for example, indicated at 22 in FIG. 1E or as contained on magnetic strip 16, optical scan area 18, or electric memory device 20 in FIGS. 1B, 1C, or 1D, respectively. If the user responds with a winning number at step 54, the debit limit for user's debit card 10 is increased by a preset amount at step 56.

Alternatively, a winning or bonus time or credit amount may be already internally known or preestablished for a given debit card account, and reflected from the server 28 to a user whenever the user initially contacts the server, or otherwise made known to the user upon first purchasing the card. For such purpose, yet a further concealment area could be provided. Still further, prize winnings may be provided as further free cards or other merchandise. For purposes of claiming such prizes, an expired card could be used as a claims ticket in a mail-in or other arrangement (such as convenience store trade-in for a fresh card) instead of being discarded as non-winning cards would be.

After increasing the debit limit of debit card 10 at step 56, or upon user's failure to respond with a winning bonus number at step 54, central system server 28 prompts user at step 58 for a gaming number as, for example, indicated at 22 in FIG. 1E or contained on magnetic strip 16, optical scan area 18, or electric memory device 20 in FIGS. 1B, 1C, or 1D, respectively. If the user responds with a valid gaming number at step 60, central server system 28 may record the number with central gaming system 34 and, if appropriate, notifies user of an instant win at step 62.

After access to central gaming system 34, or upon user's failure to respond with a valid gaming number at step 60, central system server 28 may be operative for prompting user at step 64 as to whether to enter a voice mail system at step 66. Upon receipt of an appropriate response, central system server 28 can connect the user to an internal voice mail system, such as at step 68. Upon user's exit from such system, or upon receipt of a negative response at step 66, central system server 28 may connect the user to a telephone service system at step 70, while simultaneously monitoring the length of user's call and charging the associated toll to the debit limit of debit card 10 at step 72.

It is to be understood that the subject invention includes methodologies wherein a user proceeds to various alternative order of steps, for example, such as directly from step 48 (if a positive response) to step 70. Such order may be made either through establishment of the system arrangement, or by user choice (such as prompted key entries).

If a user concludes his call at step 74 before reaching the debit limit of debit card 10, central system server 28 resets the debit limit at step 76 and ends the connection with telephone 30 at step 50. If the user reaches the debit limit of debit card 10 during a call, central system server 28 interrupts the call at step 78, prompting the user for an additional debit card. If user subsequently responds with a second valid identifying number of a second debit card 10, central system server 28 may end the interruption and continues to monitor the call at step 72. If the user fails to provide a subsequent valid identifying number at step 78, central system server 28 can end the connection with telephone 30 at step 50.

Still other features may be provided. For example, previously validated numbers may be invalidated for denial at step 48, such as for stolen or otherwise compromised cards. All such additional features and steps are intended as included with the present invention to the extent accommodated by or within the constraints of the above embodiments.

The foregoing is intended to provide one of ordinary skill in the art with an enabling disclosure of both the broad objects and concepts of the present invention, as well as specific operable embodiments thereof. Those of ordinary skill in the art will appreciate that the foregoing references to specific components or configurations thereof are by way of example only, and are not intended to limit the subject matter included in the appended claims. For example, as discussed above, various configurations of materials and components comprising a security means for securing the identifying and gaming indicia disposed on debit cards 10 are encompassed within the scope of the present invention. Additionally, various gaming methods may be employed within the method and system of the present invention.

The above exemplary description is intended to permit inclusion of such modifications, variations, and/or additions to the present invention as would be readily apparent to one of ordinary skill in the art, the scope of the present invention being set forth in the appended claims.

What is claimed is:

1. A disposable telephone debit card temporarily concealing user-needed identifying indicia thereon, comprising a supporting substrate having at least a first surface, and further comprising identifying indicia disposed on a predetermined area of said first surface, such indicia comprising a unique account code known to a central system server for subsequently enabling user access to a telephone service system for a time period bounded by a charge rate of such telephone service system and by a predetermined credit amount associated with the unique account code corresponding with said identifying indicia, including a user-removable opaque mask overlaying said identifying indicia, further comprising gaming indicia disposed on said first surface of said substrate, and a second opaque mask overlaying such gaming indicia wherein such gaming indicia represents and additional time period of access to the telephone service system.

2. A disposable telephone debit card as in claim 1, wherein at least a second portion of the unique account code appears in further indicia disposed on said substrate outside of said predetermined area of said first surface thereof.

3. A disposable telephone debit card as in claim 1, further including machine readable additional indicia recorded on magnetic media disposed on said substrate.

4. A disposable telephone debit card as in claim 1, further including machine readable additional indicia recorded on an electronic memory device disposed on said substrate.

5. A disposable telephone debit card as in claim 1, further including machine readable additional indicia recorded on optical media disposed on said substrate.

6. A disposable telephone debit card as in claim 1, wherein such gaming indicia relates to a central gaming system user accessible through the central system server.

7. A debit card calling system, comprising:

a plurality of disposable telephone debit cards with respective unique account identifying indicia associated therewith initially concealed from user, each card comprising a respective supporting substrate and unique account identifying indicia disposed on a surface thereof;

at least one distribution outlet for distributing said disposable telephone debit cards to respective users; and an access system, operative with a plurality of telephone terminals, and including a central system server, accessible by a user of such a telephone debit card via such telephone terminals, said central system server being operative for storing predetermined account information of established credit respectively corresponding to each of said disposable telephone debit cards, for promoting a card user for forwarding identifying indicia, for enabling card user access to a telephone service system upon receipt of a signal corresponding to valid identifying indicia for a time period bounded by a charge rate of such telephone service system and by the established credit amount associated with the unique account corresponding with said valid identifying indicia, and for adjusting, after the completion of access to such telephone service system by the card user, the established credit limit corresponding with the identifying indicia associated with a respective card;

wherein each of said disposable telephone debit cards further includes a user-removable opaque mask overlaying at least a portion of said unique account identifying indicia, wherein predetermined ones of said disposable telephone debit cards further include gaming indicia disposed on the respective surfaces of said substrate thereof, and further include respective opaque masks overlaying such gaming indicia wherein such gaming indicia represent respective additional time periods of access to the telephone service system, and wherein said central system server is further operative for crediting an extended access time period for corresponding winning gaming indicia on associated predetermined ones of said disposable telephone debit cards, even though the user of such card is initially unaware of the additional time period to be so extended until removal of the corresponding opaque mask.

8. A debit card calling system as in claim 7, further including machine readable additional indicia recorded on magnetic media disposed on the respective substrates of said disposable telephone debit cards, and wherein certain of said telephone terminals include means for detecting such machine readable indicia from such magnetic media.

9. A debit card calling system as in claim 7, further including machine readable additional indicia recorded on electronic memory devices disposed on the respective substrates of said disposable telephone debit cards, and wherein certain of said telephone terminals include means for detecting such machine readable indicia from such electronic memory devices.

10. A debit card calling system as in claim 7, further including machine readable additional indicia recorded on optical media disposed on the respective substrates of said disposable telephone debit cards, and wherein certain of said telephone terminals include means for detecting such machine readable indicia from such optical media.

11. A debit card calling system as in claim 7, further wherein said central system server is operative for prompting card user choice of available telephone service systems and for enabling access to a user selected telephone service system as indicated by a response signal from a card user.

12. A debit card calling system as in claim 7, further wherein said central system server is operative for prompting card user entry to an electronic voice mail system and for enabling access to such electronic voice mail system upon receipt of a predetermined card user signal.

13. A debit card calling system as in claim 7, wherein such gaming indicia relates to a central gaming system, and wherein said central system server is further operative with such central gaming system relative to such gaming indicia.

14. A debit card calling system as in claim 7, further including a plurality of distribution outlets for distributing said disposable debit cards upon payment of a preset amount per respective card in correspondence with the established credit for each such card.

15. A debit card calling system as in claim 14, wherein at least certain of said distribution outlets comprise user operated vending machines for issuing said debit cards with said identifying indicia thereof preprinted on said respective card surfaces, and with said central system server having stored said predetermined account information of established credit therefor, so that such debit cards are ready for immediate use in conjunction with said access system upon their issuance.

16. A debit card calling system as in claim 7, wherein said central system server is further operative for selectively interdicting access to the telephone service system upon expiration of the established credit for a given debit card.

17. A debit card calling system as in claim 16, wherein said central system server is further operative for selectively preventing access to the telephone service system for selected debit cards deemed to have invalid identifying indicia.

18. A debit card calling system as in claim 17, wherein said selected debit cards include debit cards for which use is unauthorized after their initial validation, such as lots of debit cards determined to have been stolen prior to their lawful transfer to an end user.

19. A debit card calling system, as in claim 7, further including a plurality of distribution machines response to user submitted payments for issuing purchased preprinted debit cards whose respective unique account identifying indicia are otherwise shielded from the user purchaser within such machines until issuance of such debit cards to the user purchaser.

20. A debit card calling system as in claim 7, wherein said central system server is further operative for enabling controlled access, for a user with a card having valid identifying indicia, to one of interstate long distance telephone service, intrastate long distance telephone service, and local telephone service, and for adjusting such user's established credit limit by a designated charge rate corresponding with the specific telephone service accessed.

21. A debit card calling system as in claim 7, wherein said central system server is further operative for indicating to a user the amount of remaining established credit associated with a particular card being used by such user.

* * * * *